United States Patent [19]
Bilas

[11] 3,740,071
[45] June 19, 1973

[54] VEHICLE SUSPENSION

[76] Inventor: Michael Bilas, 2730 Columbiana-New Castle Road, New Springfield, Ohio 44443

[22] Filed: Dec. 15, 1971

[21] Appl. No.: 208,073

[52] U.S. Cl. ............................ 280/124 R, 180/24.02
[51] Int. Cl. ............................................. B60g 11/46
[58] Field of Search ............ 180/22 D, 22 E, 24.02; 280/124; 267/32

[56] References Cited
UNITED STATES PATENTS
3,617,072  11/1971  Turner ............................ 180/24.02
2,864,453  12/1958  CaBelle .......................... 180/24.02
3,361,445  1/1968   Harbers .......................... 267/32

*Primary Examiner*—Philip Goodman
*Attorney*—Webster B. Harpman

[57] ABSTRACT

A vehicle suspension suitable for trucks and trailers positions a wheel and axle assembly on the vehicle on the trailing ends of a pair of semi-elliptic springs arranged to urge the wheel and axle assembly toward the vehicle so as to lift the same from a road surface. Air bags are positioned between the wheel and axle assembly and the vehicle and means for inflating and deflating the air bags permit the wheel and axle assembly to be lifted from the road surface or engaged therewith in a weight carrying relation to the vehicle. The semi-elliptic springs are positioned by fulcrum members engaging their center sections and their forward ends are pivoted to the vehicle or another wheel and axle assembly.

3 Claims, 3 Drawing Figures

PATENTED JUN 19 1973  3,740,071

INVENTOR.
MICHAEL BILAS
BY
W. B. Harpman
ATTORNEY

3,740,071

VEHICLE SUSPENSION

BACKGROUND OF THE INVENTION

1. Field of the Invention

This invention relates to wheeled vehicles and more particularly to suspensions for wheeled vehicles such as trucks and trailers.

2. Description of the Prior Art

Prior suspensions of this type have employed springs normally urging the wheel and axle assemblies toward the road surface and modifications have employed springs normally urging the wheel and axle assembly away from the road surface and employing air bags for urging the wheel and axle assembly toward the road surface in supporting relation to the vehicle.

(See U.S. Pat. Nos. 2,989,300, 3,063,732, 3,093,388, 3,096,995 3,113,745 and 3,285,621 and 3,617,072).

This invention eliminates some of the problems heretofore associated with the prior art vehicle suspensions and provides an arrangement wherein a wheel and axle assembly is positioned on the ends of a pair of semi-elliptic springs which are arranged in trailing arm fashion with their center sections held in fixed relation to the vehicle. This invention makes possible the use of a pair of semi-elliptic springs arranged to adjustably position a pair of wheel and axle assemblies, one at each of the ends thereof.

SUMMARY OF THE INVENTION

A vehicle suspension is disclosed which enables a pair of semi-elliptic springs or similar leaf springs to function as trailing arm assemblies in resilienty supporting a wheel and axle assembly and arranged to normally urge the wheel and axle assembly away from the road surface as to lift the same from engagement therewith. A pair of air bags positioned above the wheel and axle assembly will upon inflation cause the wheel and axle assembly to engage the road surface in supporting relation to the vehicle.

DESCRIPTION OF THE PREFERRED EMBODIMENT

Figure 1:
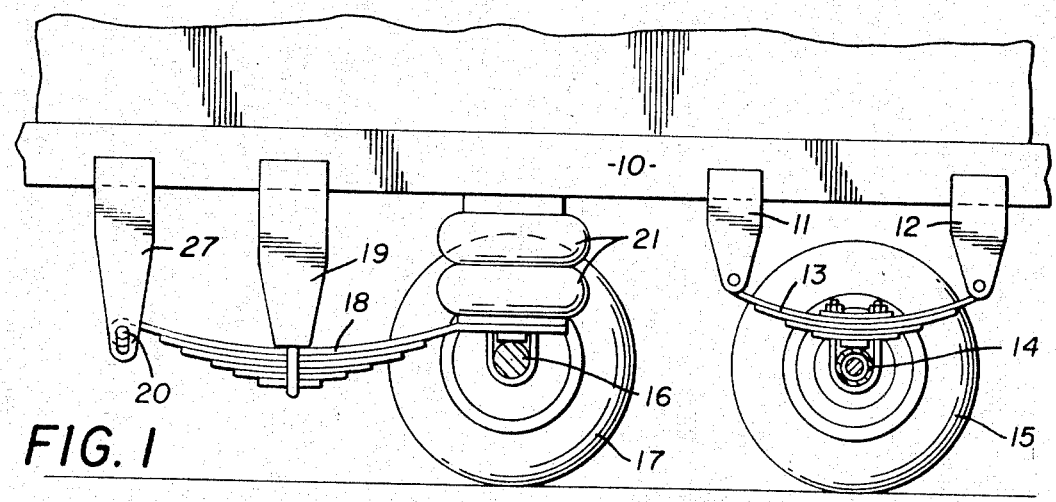
FIG. 1 is a side elevation of a vehicle with parts in cross section and parts broken away.
Figure 2:
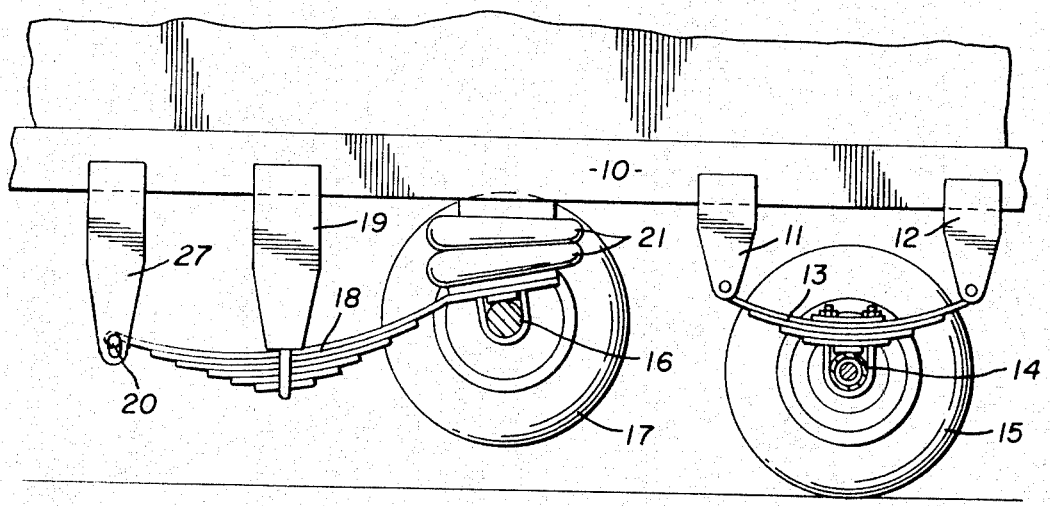
FIG. 2 is a side elevation of the vehicle with parts in cross section and parts broken away and illustrating a wheel and axle assembly in elevated relation.

In the form of the invention chosen for illustration and as seen in FIGS. 1 and 2 of the drawings, a vehicle 10 is provided with conventional spring suspension units 11 and 12 which support a pair of springs 13 and a conventional axle 14 is secured thereto. Wheels 15 are mounted on the axle 14 in the usual manner. The vehicle 10 is provided with an auxiliary wheel and axle assembly in which the axle is indicated by the numeral 16 and the wheels by the numeral 17 and which auxiliary wheel and axle assembly is preferably positioned forwardly of the axle 14 on the vehicle 10. The axle 16 is supported on the trailing ends of a pair of semi-elliptic springs 18 which are secured at their center points by a fulcrum member 19 which is secured at its upper end to the vehicle 10. The forward ends of the semi-elliptic springs 18 are pivotally mounted on a pivot 20 secured to a spring suspension unit 21 which is also mounted on the vehicle 10.

In FIG. 1 of the drawings, air bags 21 are shown in inflated position between the trailing ends of the springs 18 and the vehicle 10 so as to urge the axle 16 and its wheels 17 downwardly against a road surface and in supporting relation to the vehicle 10.

By referring now to FIG. 2 of the drawings, it will be seen that the air bags 21 have been deflated and that the pair of springs 18 have lifted the axle 16 and the and the pair of wheels 17 thereon upwardly toward the vehicle 10 and away from the road surface.

Figure 3:
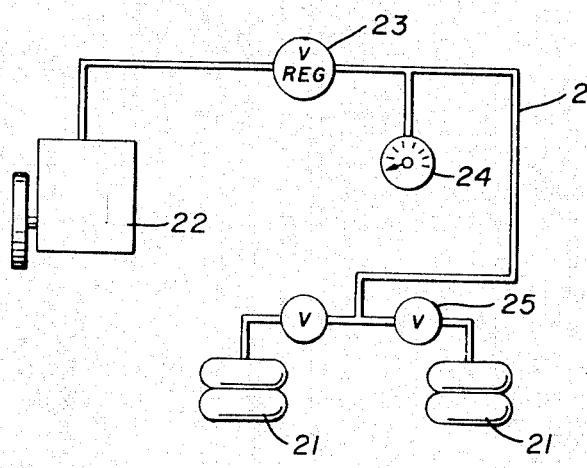
FIG. 3 is a symbolic diagram of an air inflation system for the air base seen in FIGS. 1 and 2 of the drawings.

In FIG. 3 of the drawings, a symbolic diagram of means for inflating and deflating the air bags 21 may be seen and by referring thereto it will be observed that a compressor is indicated by the numeral 22, a regulator at 23, a gauge at 24 and control valves 25 are positioned in connecting piping 26.

It will thus be seen that when the vehicle is carrying a load the air bags 21 may be inflated and the auxiliary axle 16, with its wheels 17 used to help support the load and spread the same over a greater area of the roadway. At such time as the vehicle is empty the air bags 21 may be deflated and the springs 18 will lift the axle 16 with its wheels 17 away from the roadway. There are several advantages both with respect to wear and tear on the auxiliary wheels 17 and tax-wise in that the number of axles supporting a vehicle on a roadway determine the tax rate in many jurisdictions.

Those skilled in the art will observe that the pair of springs 18 act as trailing arms in that they hold the axle 16 and the wheels 17 thereon in desirable position beneath the vehicle 10 and at the same time permit it to move relative thereto. The vehicle suspension disclosed herein can be modified by substituting a second auxiliary axle having wheels thereon, not shown, for the pivot 20 at the forward ends of the springs 18 whereupon the springs 18 will be in a position to lift two axles and their associated wheel assemblies. In such a modification it will be understood that a second pair of air bags will be positioned between the second axle and the vehicle and operable in the same manner as the air bags 21 hereinbefore described.

It will thus be seen that an improved and simplified vehicle suspension has been disclosed which enables an operator of a truck or a truck-trailer combination to lift one or two axles from ground engagement when in a no-load condition and thereby cut down on wear on the wheel and axle assemblies which would otherwise take place as well as reducing the number of wheel and axle assemblies on the truck for tax purposes. At such time as the truck or truck-trailer combination is loaded one or the other of the liftable wheel and axle assemblies may be elevated to facilitate turning on a sharp radius.

Although but one embodiment of the present invention has been illustrated and described, it will be apparent to those skilled in the art that various changes and modifications may be made in the invention without departing from the spirit of the same and having thus described my invention what I claim is:

1. A wheel suspension for a vehicle including a wheel and axle assembly, parallel elongated springs on said vehicle having free end portions attached to the axle of said wheel and axle assembly, means on said vehicle holding the middle portions of said elongated springs, said elongated springs normally urging said wheel and axle assembly toward said vehicle and air bags between said wheel and axle assembly and said vehicle acting when inflated to move said wheel and axle assembly away from said vehicle and means for inflating and deflating said air bags.

2. The wheel suspension of claim 1 and wherein said elongated springs consist of a pair of leaf springs having a semi U-shaped configuration in unloaded condition.

3. The wheel suspension of claim 1 and wherein the means on the vehicle engaging the springs in the middle thereof comprises a support member secured to said springs and said vehicle and means on the vehicle engaging the opposite ends of the springs with respect to the wheel and axle assembly consisting of pivots secured to said vehicle so as to position said elongated springs in trailing arm relation thereto.

* * * * *